April 10, 1962
W. H. MUIRES
3,028,745
UNIVERSAL PRESSURE BALANCE OR DEADWEIGHT TESTER
Filed Nov. 27, 1959
2 Sheets-Sheet 1
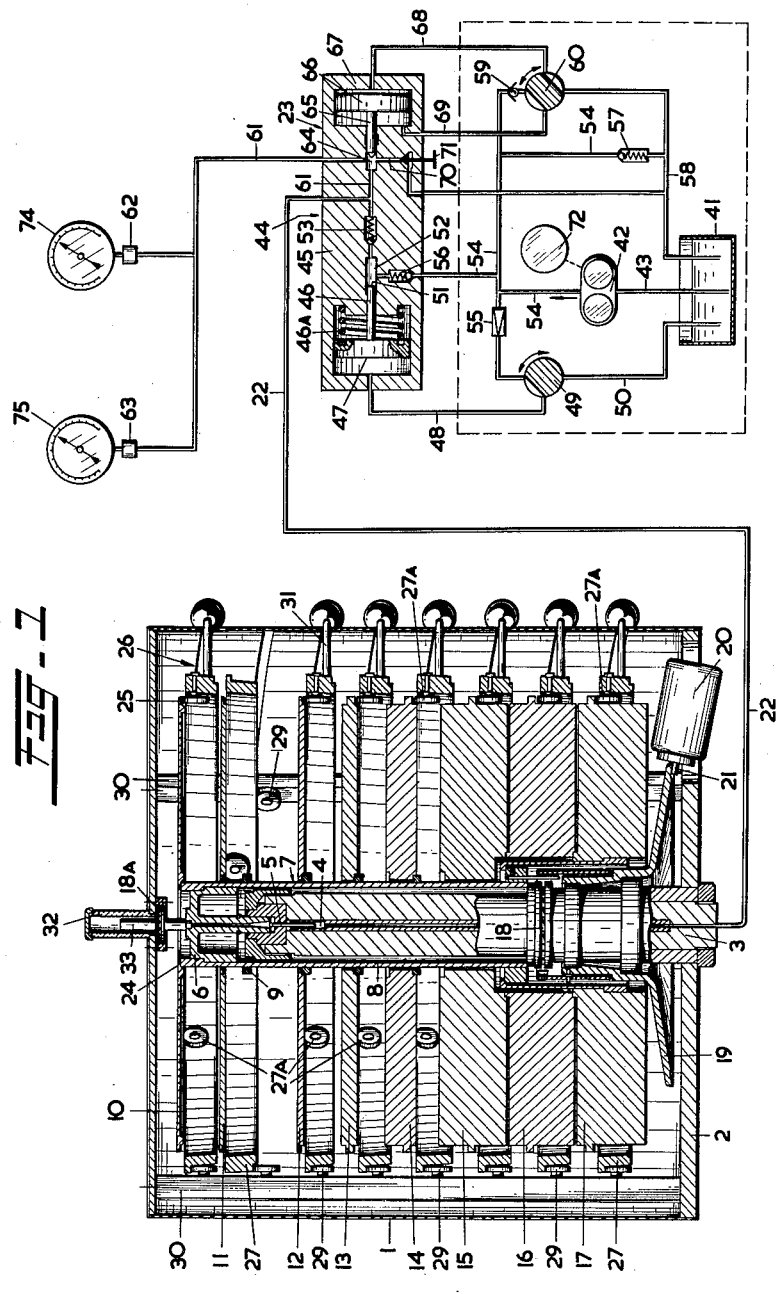
INVENTOR
Wilhelm Herman Müires
BY *Stevens Davis Miller & Mosher*
ATTORNEYS

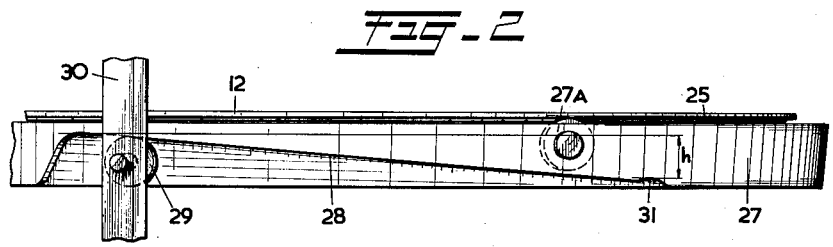
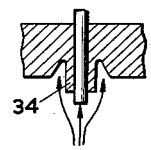
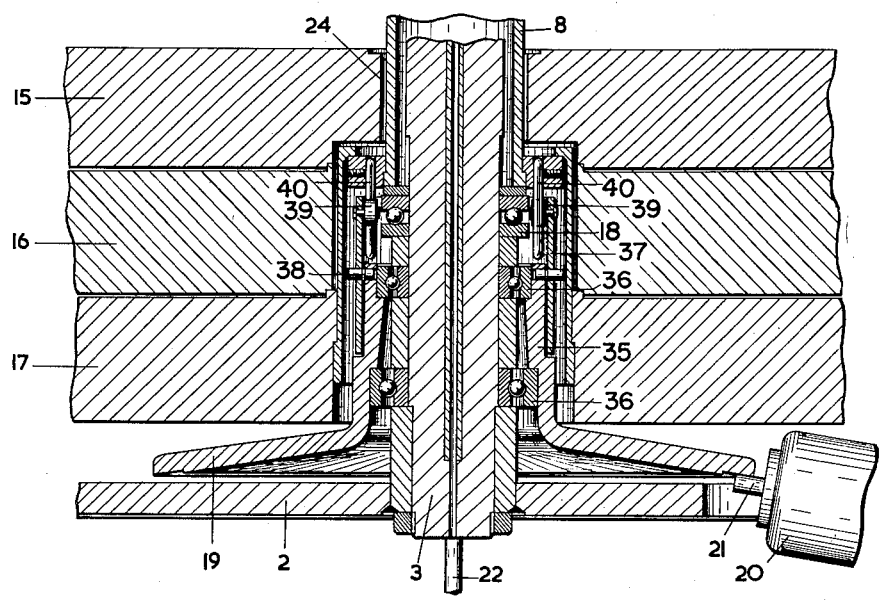

United States Patent Office 3,028,745
Patented Apr. 10, 1962

3,028,745
UNIVERSAL PRESSURE BALANCE OR DEAD-WEIGHT TESTER
Wilhelm Hermann Müires, The Hague, Netherlands, assignor to W. C. T Hart & Z.N. Instrumenten- en Apparatenfabriek N.V., Rotterdam, Netherlands, a corporation of the Netherlands
Filed Nov. 27, 1959, Ser. No. 855,676
4 Claims. (Cl. 73—4)

This invention relates to an improvement in pressure balance or deadweight tester. An apparatus of this type makes use of a number of weights which might in different combinations be put into the apparatus in order to obtain the fluid pressure value required or to be measured.

An object of the present invention resides in facilitating the operation of this kind of apparatus. Up till now interchanging the weights was done manually by taking the weights which were no longer required out of the apparatus and by introducing into the apparatus the weights required for the particular condition under which the apparatus was to be used. The interchanging of the weights not only appears to be quite laborious when the conditions under which the apparatus is used ofter change, but it also appears to be quite tiring for the person working with the apparatus.

It is therefore an important object of the present invention to procure a universal pressure balance or deadweight tester in which the weights are no longer taken out or put into the apparatus and in which by a small number of weights a great number of stepwise increasing pressure values might be obtained.

A further object of the invention resides in the provision of an apparatus capable of calibrating pressure gauges having a wide range of working pressures.

An important further object of the present invention resides in the provision of a sufficient number of pressure steps for each pressure range.

Finally the present invention aims at procuring a universal pressure balance or deadweight tester operating with very great accuracy and being of easy operation.

The above objects are obtained according to the invention in a universal pressure balance or deadweight tester comprising a cylinder with a plunger movable within said cylinder, a high pressure conduit connecting said cylinder with a source of high pressure fluid, a weight support connected to said plunger, a number of weight elements accommodated upon said support, driving means for imparting a relative rotation between said plunger and said cylinder around a line coinciding with the axis of the plunger, means for arbitrarily releasing the load of at least some of said weight elements individually from said support, the mass of said elements being determined such that the weights or group of weights form a progression which—at least for the middle part of it—is a geometrical series or a sequence of geometrical series. As a result the different pressure steps may easily be obtained by lifting one or more weight elements and/or lowering one or more other weight elements upon the support.

In a preferred embodiment the universal pressure balance or deadweight tester according to the invention comprises a cylinder with a plunger movable within said cylinder, a high pressure conduit connecting said cylinder with a source of high pressure fluid, a dome-shaped weight support mounted upon said plunger coaxially with said plunger and cylinder, said support fitting with clearance around said cylinder a number of weight discs each having a central bore and a horizontal running surface around the outer circumference, each of said weight discs resting upon a flange on the outer surface of the dome-shaped weight support, driving means for rotating said dome-shaped weight support around a vertical line co- inciding with the axis of said plunger, lifting means for each of said weight discs comprising a ring adapted to co-operate on one side with said disc and having a wedge-shaped surface on the opposite side, rollers being in contact with said latter surface so that upon angular rotation of said ring, the weight disc is lifted from its supporting flange, the mass of said discs being determined such that the weights form a progression which—at least for the middle part of it—is a geometrical series.

A feature of the present invention resides in the provision of an easy operable weight lifting and lowering means in which the operator distinctly knows that each weight disc is in his operative or inoperative position. This object is realized in that the lifting ring for each weight disc comprises at least three wedge-shaped surfaces positioned at equal intervals along the circumference of the ring, each surface co-operating with a roller and having a recess near one end of the wedge-shaped surface for co-operating with said roller, said end of said surface corresponding to the raised position of the weight disc.

A further feature of the invention is to provide means for diminishing loss of pressure fluid out of the cylinder of the balance. This object is realized in that the cylinder wall near the point of entrance of the plunger has a tubular extension, the free end of which is directed to the interior of the cylinder, said extension being coaxial with and closely surrounding said plunger.

A further feature of the invention resides in the provision of a universal pressure balance or deadweight tester in which the source of high pressure fluid comprises a reservoir, a low pressure pump connected with its suction side to said reservoir and a pressure booster operated by said pump.

A further feature of the present invention resides in the provision of a universal pressure balance or deadweight tester, comprising a cylinder with a plunger movable within said cylinder, a high pressure conduit connecting said cylinder with a source of high pressure fluid, a branch conduit jointing said high pressure conduit with at least one connection for a pressure gauge, a weight support connected to said plunger, a number of weight elements accommodated upon said support, driving means for imparting a relative rotation between said plunger and said cylinder around a line coinciding with the axis of the plunger, means for arbitrarly releasing the load of at least some of said weight elements individually from said support, the mass of said elements being determined such that the weights or groups of weights form a progression which—at least for the middle part of it—is a geometrical series or a sequence of geometrical series.

A further object of the present invention is to provide an apparatus in which the fluid pressure may be easily generated by manually operable means and in which the connection of the pressure fluid to the pressure gauge to be tested is temporarily interrupted during each change in pressure produced by the lifting and lowering of the weight elements. This object is realized according to the present invention in that the source of high pressure fluid comprises a reservoir, a low pressure gear pump connected with its suction side to said reservoir, a pressure booster consisting of a differential piston the larger surface of which may be connected either to the discharge side of said gear pump or to the reservoir by means of a three-way valve, the smaller surface of said differential piston being capable of producing said high pressure fluid into a cylinder which through a non-return valve is connected to the discharge side of said gear pump and to the high pressure conduit leading to the cylinder of said balance or tester, the branch conduit for the connection to at least one pressure gauge comprising a needle valve having a control piston, one side of which may be connected either to the discharge side of said gear pump or to the reservoir by means of three connections of a four-way valve, the fourth connection of which is linked up with the other side of said control piston such that said latter side may be connected either to the discharge side of said gear pump or to the reservoir, both said three-way valve and said four-way valve being manually operable.

These and other objects and novel features of the invention will be more clearly and fully set forth in the following specification and claims.

In the drawings forming a part of the specification:

FIGURE 1 is a schematic section of the universal pressure balance or deadweight tester showing the general construction thereof.

FIGURE 2 is a sectional view through a portion of the device for lifting and lowering the weight elements.

FIGURE 3 is a sectional view through a portion of the cylinder and plunger, showing the sealing of the plunger in the cylinder wall.

FIGURE 4 is a sectional view through the lower portion of the weight support.

*Pressure Balance Construction*

The pressure balance or dead-weight tester includes a housing 1 having a base plate 2 in which is mounted a central column 3. Near the top of this column a cylinder 4 with a plunger 5 is accommodated. The end of the plunger 5 outside the cylinder 4 fits conically in the central part 6 of a dome-shaped weight support 7. This weight support has a generally cylindrical part 8 fitting with clearance around the central column 3. Spaced in axial sense, a number of flanges 9 are mounted on the outer surface of part 8 of the weight support 7. Resting upon these flanges 9 or lifted somewhat above these flanges are a number of weight discs 10—17. A conical flange 19 is mounted near the base plate 2 coaxially with the central column 3. This flange is adapted to engage the tubular part 8 in a way described more in detail with reference to FIGURE 4. In the base plate 2 an electric motor 20 is mounted having a friction wheel 21 which is in contact with a zone near the outer circumference of the flange 19. A conduit 22 partly extending in the interior of the central column 3 connects the cylinder 4 with the source of pressure fluid generally indicated at 23.

Each of the weight dics 10—17 has a central bore 24 and an annular extension 25 around the outer circumference. The bore 24 fits with clearance around the weight support 7. The extension 25 co-operates with lifting means 26. As shown in FIGURE 1 the lifting means 26 for the weight discs 10 and 12—17 are in inoperative position whereas the lifting means for the weight disc 11 is in operative position, which means that the weight disc 11 is lifted from its flange 9 so that it no longer contributes to the force exerted on the plunger 5.

As clearly shown in FIGURE 1 the weight discs are unequal in thickness, so that each disc represents a different pressure value. In principle the weights of the discs are determined such that a geometrical series is obtained having a ratio 2 so that with the aid of eight weights a maximum combination of 127 steps is possible. For practical reasons however the greatest weight disc is divided into two halves which each have the same size as the weight disc immediately preceding following in the series.

These three weight discs need not be lifted selectively so that one can always start with lifting the uppermost weight disc 15, then the middle disc 16 and finally the bottom disc 17. A further consequence is that the three weights 15—17 can be placed on top of each other, thus saving vertical height. It may be observed that the three lowest discs have been piled in a conventional manner, contrary to the characteristic arrangement of the other discs 10—14.

In the example shown in FIGURE 1 the weights may have the following values expressed in units of pressure obtained in cylinder 4. A pressure range up to 48,500 p.s.i. is covered by the (minimum) weight of the weight support 7 and eight weight discs, representing the following pressure fractions:

1000 (weight support) _____ p.s.i.
1000 _____ p.s.i.
12000 _____ p.s.i.
12000 _____ p.s.i.
12000 _____ p.s.i.
6000 _____ p.s.i.
3000 _____ p.s.i.
1000 _____ p.s.i.
1000 _____ p.s.i.
500 _____ p.s.i.

As will become clear from the above series, the range of 1000–48500 p.s.i. can be subdivided into 95 steps of 500 p.s.i. each. Hence a gauge with a maximum pressure of 5000 p.s.i. can still be calibrated at nine pressure levels from 1000—5000 p.s.i.

Somewhat different from the embodiment shown in FIGURE 1 the pressure range up to 3225 kg./cm.$^2$ is covered by the weight of the weight-support 7 and eight weight discs representing the following pressure fractions:

50 (weight support) _____ Kg./cm.$^2$
800 _____ Kg./cm.$^2$
800 _____ Kg./cm.$^2$
800 _____ Kg./cm.$^2$
400 _____ Kg./cm.$^2$
200 _____ Kg./cm.$^2$
100 _____ Kg./cm.$^2$
50 _____ Kg./cm.$^2$
25 _____ Kg./cm.$^2$ This series will permit the subdivision of the range of 50–3225 kg./cm.$^2$ in 127 steps of 25 kg./cm.$^2$ each.

The above mentioned weight values have been selected in order to use the same design and approximately the same pressure range for both the p.s.i. and the kg./cm.$^2$ system. The weight discs for 12000 p.s.i. and 800 kg./cm.$^2$ are identical. Similarly those for 6000 p.s.i. and 400 kg./cm.$^2$ and those for 3000 p.s.i. and 200 kg./cm.$^2$. The correct conversion factor of kg./cm.$^2$ versus p.s.i. ($\equiv 14.223$) has been obtained by adjusting the plunger diameters. In the embodiment of the pressure balance described in this specification, the diameter of the plunger 5 for the p.s.i. system is 2.90 mm. or .114 inch whilst for the kg./cm.$^2$ system the diameter is 2.98 mm. or .117 inch. For manufacturing purpose it is advisable to reduce the structural differences between the apparatus adapted to the p.s.i. system and the one adapted to the metric system. To this end the interchange of the plunger 5 is facilitated by embodying the upper side of the central column 3 through which the plunger 5 passes as a separate element which might be connected to the central column by means of a screw thread connection (not shown).

It is observed that the weight discs may also form the following series:

1, 2, 4, 5, 10, 20, 40, 50   (A)

or also 1, 1, 3, 3, 9, 9, 27, 27   (B)

In both cases it is not the individual weights which form a geometrical series but in case A they form a sequence of geometrical series. In case B groups of equal weights form a geometrical series. The combinations mentioned under A and B are less favorable than the example shown in FIGURE 1 but they might be used.

The weight lifting system as shown more in details in FIGURE 2 consists of a ring 27 adapted to co-operate on its upper side through the intermediary of a few rollers 27A with the disc to which the system belongs. The ring 27 has a wedge-shaped surface 28 at its lower side, said surface co-operating with a roller 29 rotatably mounted upon a support 30 which is connected with the base plate 2. Each ring 27 comprises three of these wedge-shaped surfaces positioned at equal intervals along the circumference of the ring. Upon each ring is mounted a handle 30 protruding out of the housing 1 and displaceable within a slot (not shown) in the wall of the housing 1, the shape of the slot being adapted to the inclination and length of the wedge-shaped surfaces 28.

In order to indicate to the operator that the weight lifting system is in one of its end positions and in order to stabilize these end positions, the wedge-shaped surface 28 has a recess 31 near its lower end, into which recess the roller 29 is held when the weight disc is in its lifted position. In the lowered position of the lifting system the unrecessed part of the ring 27 abuts against the roller 29 so that the operator clearly knows that the system is in either of its end positions.

In the drawings the rise of the lifting system between the lowermost and the uppermost position is indicated with $h$ in FIGURE 2. It is obtained by a turning movement of the ring 27 over about 76°. The value of $h$ in the described embodiment is 19 mm. or .75 inch.

Like any pressure balance in operation the plunger weight assembly will sink during pressure equilibrium conditions owing to the leak of oil past the plunger. Thus any pressure balance has a "level-range" with respect to the position of the plunger-weight assembly. Within this level range the assembly is truly floating. In the balance according to the present invention the movement of the weight assembly is limited between the extremities of the above level range by thrust bearings 18 and 18A. Irrespective of the position of the weight support within the level range, the weight lifting system must always fulfill its function. This means that if the level range be indicated by $a$ the following equation has to be satisfied:

$$a < h$$

Actually the level range equals 12 mm. or .5 inch.

The extremities of the level range $a$ are marked on a transparent tube 32 into which a level indicator 33 mounted on top of the central part 6 of the weight support 7 extends. The indicator 33 carries at its top a hexagonal red disc which should always be seen between two line marks on the transparent tube 32 during operation of the apparatus.

Although the universal pressure balance according to the present invention is primarily intended for checking and calibrating gauges, it can as well be used as a laboratory instrument for measuring and setting arbitrary pressures. In this latter case the level indicator 33 is made to carry a small pan (not shown) said pan containing an arbitrary amount of smaller weights. The effective diameter of the plunger enables the operator to interpret these additional weights in terms of pressure. With this arrangement the indication of the pressure balance is not confined to the fixed pressure steps in the range of 1000–48,500 p.s.i. or of 50–3225 kg./cm².

As clearly indicated in FIGURE 3 the wall of the cylinder 4 near the point of entrance of the plunger 5 has a tubular extension 34 protruding into the interior of the cylinder. Normally the leak of oil would tend to increase with increasing pressures by virtue of the slightly expanding cylinder 4. By means of the feature shown in FIGURE 3 the lower protruding part of the extension 34 is subject to an external hydraulic pressure which tends to close the clearnace between the plunger 5 and the cylinder wall. The result is that leak of oil decreases by increasing fluid pressure.

As already indicated in the preceding part of the specification, the weight support 7 is rotated by the electric motor 20. FIGURE 4 shows how this rotation is transmitted from the flange 19 to the cylindrical part 8 of the weight support 7. The flange 19 has a cylindrical extension 35 rotatably supported on two bearings 36 around the lower part of the central column 3. Coaxially with this extension 35 and supported upon it is a cylindrical sleeve 37 pivotally connected to the extension 35 by means of two pins 38. The sleeve 37 has at its upper end two small bearings or rollers 39 against the outer ring of which may abut a stem 40 mounted on the lower side of the cylindrical portion 8 of the weight support 7 in the region of the bearing 18. The rotational impulse imparted through the motor 20 and friction wheel 21 to the flange 19 is transmitted through the pins 38 to the sleeve 37 and hence to the rollers 39 and stems 40 to the cylindrical part 8 of the weight support 7. The rollers 39 eliminate any friction which might arise from a vertical movement of the weight support 7 (within the level range $a$) and the pins 38 permit a slight tilting movement of the sleeve 37 so that at any rate both pins 40 co-operate in the transmission of the rotational movement from the flange 19 to the weight support 7.

During pressure equilibrium conditions the only friction which the motor 20 has to overcome, is the friction of the plunger 5 in the wall of the cylinder 4 and the friction of the cylindrical extension 35 on its bearings 36 (apart from some negligible air friction).

*Source of Pressure Fluid*

The pressure balance or deadweight tester is connected to the source of pressure fluid 23 by means of a conduit 22. The source of pressure fluid comprises a reservoir 41, a low pressure gear pump 42 connected with its suction side by means of a tubing 43 to the reservoir 41. The source further comprises a pressure booster or intensifier 44 consisting of a body 45 and a differential piston 46 the larger surface 47 of which is connected through a conduit 48, a three-way valve 49 and a conduit 50 to the reservoir 41. The piston 46 is urged to the left (in FIGURE 1) by a spring 46A. The smaller surface 51 of the differential piston 46 is capable of producing the required high pressure fluid in a cylinder 52. This latter cylinder is connected to the conduit 22 through a non-return valve 53. A conduit 54 at the discharge side of the gear pump 42 is connected through a pressure regulator 55 to the three-way valve 49 and through a non-return valve 56 to the cylinder 52 for the high pressure fluid. The conduit 54 is further connected through a spring-urged non-return valve 57 to a conduit 58 leading to the reservoir 41. Finally the conduit 54 is connected through a non-return valve 59 to a four-way valve 60. One of the ports of this latter valve is connected to the conduit 58.

Within the body 45 of the booster 44, a branch conduit 61 is connected to the conduit 22, said branch conduit leading to two connections 62 and 63 for pressure gauges. In the part of the conduit 61 lying within the body 45 of the booster 44 a chamber 64 is accommodated within which a needle valve 65 with a control piston 66 is movable. The piston 66 is mounted in a cylinder 67 one side of which is connected through a conduit 68 to the four-way valve 60 whilst the other side is also connected to the four-way valve through the conduit 69. Finally the chamber 64 has a bleeding-off conduit 70 leading to the conduit 58, under the control of a manually operable release valve 71. The gear pump 42 is driven by a power source 72.

When the balance or tester is in use, the gear pump 42 driven by the motor 72 runs continuously. Any excess delivery is recycled to the reservoir 41 via the spring loaded non-return valve 57, which in the embodiment shown in the drawings is set at an operating pressure of about 250 p.s.i.

For the operation of the booster 44 the fluid pressure from the pump 42 is reduced by the pressure regulator 55 to about 150 p.s.i. With the three-way valve 49 in the position shown in FIGURE 1, the gear pump pressurizes the low pressure side 47 of the booster 44 effecting a power stroke of the piston 46. The small diameter side 51 of the booster forces the fluid past the spring loaded non-return valve 53 into the conduit 22 and hence into the cylinder 4 of the balance. When the piston 46 has reached the end of its stroke the three-way valve 49 is turned anti-clockwise which means that the connection of the conduit 48 with the conduit 54 is interrupted and a passage from the conduit 48 through the conduit 50 to the reservoir 41 is opened. The pressure fluid acting on the surface 47 of the piston 46 flows back into the reservoir 41 by the action of the spring 73. Simultaneously the cylinder 52 on the smaller side 51 of the piston 46 is filled with low pressure fluid from the conduit 54 through the non-return valve 56. An angular displacement of the three-way valve 49 clockwise, i.e. back again to its position shown in FIGURE 1 initiates another power stroke of the piston 46. A full cycle of the booster 44 requires only a few seconds. It appears that the duration of a power stroke is distinctly audible as a result of the variation in the flow of low pressure fluid through the non-return valve 57. This may give a signal to the operator and thus facilitates the operation of the pressure booster by means of the three-way valve 49.

The four-way valve 60 controls the position of the needle valve 65. In FIGURE 1 this needle valve is shown in its open position. Turning of the valve 60 anti-clockwise from its position shown in FIGURE 1, releases the pressure on the left hand side of the control piston 66 through the conduits 69 and 58 and supplies low pressure fluid to the right hand side of said piston through the conduit 68. The piston 66 moves to the left and the needle valve 65 closes the connection between the branch conduit 61 and the high pressure conduit 22. This manipulation of the four-way valve 60 is effected whenever the load on the pressure balance is to be changed in order to generate a different pressure during the calibration operation of the gauges 74 and 75. The shut-off movement of the needle valve 65 is required to avoid undesirable hysteresis effects in the calibration of the gauges.

When calibrating a pressure gauge the successive pressure levels can be attained in either of the three following ways:

(1) Starting from the minimum pressure, the fluid pressure is stepped up by a mere pressure rise between two consecutive measurements;

(2) Starting from the maximum pressure, the fluid pressure is lowered each time by a mere pressure drop between two consecutive measurements;

(3) After each measurement upon a certain pressure level, the fluid pressure is dropped to zero before the next pressure level (higher or lower) is effected.

It will be clear that in the balance according to the present invention the methods mentioned under 1 and 2 cannot be applied without the above special arrangement. It is possible for instance that a pressure rise of 1000 p.s.i. (one step upwards) must be acquired by lifting two weight discs of 1000 p.s.i. each and subsequently lowering one weight disc of 3000 p.s.i. This would involve a pressure drop of 2000 p.s.i. followed by a pressure rise of 3000 p.s.i. Thus an error would be introduced due to the hysteresis effect inherent to a pressure gauge. Similarly a pressure drop of 200 kg./cm.² may only be possible by lifting one weight disc of 400 kg./cm.² and lowering one weight disc of 200 kg./cm.². Both operations are contradictory to the methods mentioned under 1 and 2.

To overcome this contradiction, the needle valve 65 with its control piston 66 is accommodated between the conduit 22 and the branch conduit 61. This needle valve serves to isolate the gauges on test from the pressure balance whilst a load change on the weight support 7 is carried out. Once the pressure balance has been adjusted the valve 65 is opened by means of a return movement of the four-way valve 60 to its position shown in FIGURE 1, and the fluid pressure can be raised by the actuation of the three-way valve 49 or be lowered by bleeding off through the valve 71.

The needle valve 65 can be kept closed against the high pressure in the conduit 22 by maintaining the output pressure of the gear pump 42 on the right hand side of the control piston 66. This pressure, however, is subjected to a sudden drop whenever the discharge of the gear pump 42 is directed by the three-way valve 49 to the surface 47 of the pressure booster 44. For this reason the non-return valve 59 has been inserted. It prevents the booster from being pressurized at the cost of the pressure which keeps the needle valve 65 closed.

At high pressures, with the needle valve 65 closed, a power stroke of the piston 46 tends to open the needle valve 65—be it even slightly—as a result of the hydraulic axial thrust exerted on the point of the needle. In order to keep the valve 65 firmly closed, the pressure regulator 55 is employed which ensures that the pressure (250 p.s.i.) on the piston 66 is well above the pressure (150 p.s.i.) on the surface 47 of the piston 46 of the booster 44.

The displacement of fluid caused by the axial movement of the needle valve 65 is absorbed by a slight rise in the weight support 7 of the balance. However, the inertia of the weight support-piston assembly tends to retard this absorption with the result that the movement of the needle valve is felt as a pressure shock stirring the pressure gauge(s) on test. This disturbance will be dampened to a negligible effect by inserting in the high pressure conduits an extra length of capillary tubing, thus providing for a larger shock absorbing fluid volume and an increased hydraulic resistance between the needle valve and the gauges.

In accordance with the patent statutes I have described the principles of construction and operation of my universal pressure balance or deadweight tester, and while I have endeavored to set forth the best embodiment thereof, I desire to have it understood that obvious changes may be made within the scope of the following claims without departing from the spirit of my invention.

What I claim is:

1. A universal pressure balance or deadweight tester comprising a cylinder with a plunger movable within said cylinder, a high pressure conduit for connecting said cylinder with a source of high pressure fluid, a dome-shaped weight support mounted upon said plunger coaxially with said plunger and cylinder, said support fitting with clearance around said cylinder, a number of weight discs each having a central bore and a horizontal running surface around the outer circumference, each of said weight discs individually resting upon a flange on the outer surface of the dome-shaped weight support, driving means for rotating said dome-shaped weight support around a vertical line coinciding with the axis of said plunger, lifting means for each of said weight discs comprising a ring adapted to supportingly co-operate on one side with an associated one of said weight discs and having a wedge-shaped surface on the opposite side, ring lifting rollers in contact with said latter surface so that upon angular rotation of said ring, the associated weight disc is lifted from its respective supporting flange, the mass of at least certain of said weight discs being arranged to form a progression which is a geometrical series.

2. A universal pressure balance or deadweight tester according to claim 1, characterized in that the lifting ring for each weight disc comprises at least three of said wedge-shaped surfaces positioned at equal intervals along the circumference of the ring, each surface co-operating with one of said rollers and having a recess near one end of the wedge-shaped surface for co-operating with an associated one of said rollers, said end of each surface corresponding to the raised position of the weight disc.

3. A universal pressure balance or deadweight tester according to claim 1, characterized in that the driving means for rotating the dome-shaped weight support consists of a motor driving a friction wheel, said wheel cooperating with a flange mounted on said weight support below the lowermost weight disc.

4. A universal pressure balance or deadweight tester comprising a cylinder, a plunger movable within said cylinder, a high pressure conduit for connecting said cylinder with a source of high pressure fluid, driving means for imparting a relative rotation between said plunger and said cylinder about the plunger axis, a weight support connected to said plunger, a plurality of weight elements accommodated upon said support, said support being provided with means for individually supporting each weight element, and lifting means for individually lifting each weight element from its support independently of any other weight element, the masses of at least three weight elements being arranged to form a progression which is a geometrical series.

References Cited in the file of this patent

UNITED STATES PATENTS

| | | |
|---|---|---|
| 1,278,713 | Moore et al. | Sept. 10, 1918 |
| 1,785,542 | Dockl | Dec. 16, 1930 |
| 2,766,612 | Michels | Oct. 16, 1956 |

FOREIGN PATENTS

| | | |
|---|---|---|
| 691,124 | France | July 7, 1930 |